(12) United States Patent
Hung et al.

(10) Patent No.: US 10,797,604 B1
(45) Date of Patent: Oct. 6, 2020

(54) LLC RESONANT CONVERTER

(71) Applicant: ASIAN POWER DEVICES INC., Taoyuan (TW)

(72) Inventors: Tsung-Liang Hung, Taoyuan (TW); Yeu-Torng Yau, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 16/544,109

(22) Filed: Aug. 19, 2019

(30) Foreign Application Priority Data

May 30, 2019 (TW) .............................. 108118748 A

(51) Int. Cl.
*H02M 3/335* (2006.01)
*H02M 7/48* (2007.01)
*H02M 1/32* (2007.01)

(52) U.S. Cl.
CPC ......... *H02M 3/33569* (2013.01); *H02M 1/32* (2013.01); *H02M 7/4826* (2013.01); *H02M 2007/4815* (2013.01); *H02M 2007/4822* (2013.01)

(58) Field of Classification Search
CPC . H02M 2001/0058; H02M 2007/4815; H02M 2007/4826
See application file for complete search history.

(56) References Cited

U.S. PATENT DOCUMENTS

| | | | | |
|---|---|---|---|---|
| 8,837,173 | B2 * | 9/2014 | Huang | H02M 3/3376 363/21.02 |
| 9,660,536 | B2 * | 5/2017 | Hosotani | H02M 3/338 |
| 10,581,319 | B1 * | 3/2020 | Lin | H02M 3/33569 |
| 2008/0144339 | A1 * | 6/2008 | Hsieh | H02M 3/33592 363/21.02 |
| 2009/0244933 | A1 * | 10/2009 | Wang | H02M 3/33592 363/21.06 |
| 2013/0294113 | A1 * | 11/2013 | Liang | H02M 3/3382 363/20 |
| 2014/0247625 | A1 * | 9/2014 | Hosotani | H02M 3/33507 363/17 |
| 2014/0268897 | A1 * | 9/2014 | Zimmanck | H02M 3/3353 363/17 |
| 2014/0268899 | A1 * | 9/2014 | Hosotani | H02M 3/33569 363/17 |
| 2015/0244341 | A1 * | 8/2015 | Ritter | H03H 7/38 307/104 |
| 2016/0072388 | A1 * | 3/2016 | Dubus | H02M 3/1584 363/25 |
| 2018/0248489 | A1 * | 8/2018 | Wang | H02M 7/217 |

(Continued)

*Primary Examiner* — Thienvu V Tran
*Assistant Examiner* — Sisay G Tiku
(74) *Attorney, Agent, or Firm* — Schmeiser, Olsen & Watts, LLP

(57) ABSTRACT

An LLC converter includes a switch module, a transformer, an output circuit, a resonant circuit and a safety capacitor. The switch module is connected between an input voltage and a ground. The transformer has a primary side winding and at least one secondary side winding. The output circuit is connected between the at least one secondary side winding and a load. The resonant circuit is coupled between the primary side winding and the switch module and includes at least one leakage inductor. The safety capacitor is connected between the at least one leakage inductor and the switch module.

8 Claims, 3 Drawing Sheets

(56) References Cited

U.S. PATENT DOCUMENTS

| 2019/0044447 A1* | 2/2019 | Wang | H02M 3/33576 |
| 2019/0068069 A1* | 2/2019 | Sheng | H02M 3/07 |
| 2019/0074774 A1* | 3/2019 | Chen | H02M 3/325 |
| 2019/0157978 A1* | 5/2019 | Ni | H02M 1/14 |

* cited by examiner

LLC RESONANT CONVERTER

CROSS-REFERENCE TO RELATED APPLICATION

This non-provisional application claims priority under 35 U.S.C. § 119(a) on Patent Application No(s). 108118748 filed in Taiwan, R.O.C. on May 30, 2019, the entire contents of which are hereby incorporated by reference.

BACKGROUND OF THE INVENTION

1. Field of the Invention

The present disclosure relates to LLC converters, and in particular to an LLC converter which is conducive to a great reduction in the size of its transformer without compromising its compliance with safety insulation.

2. Description of the Related Art

Safety standards embody clear description and guidance on devices to be manufactured and their parts and components with a view to providing safe, high-quality products to end users. Safety standard certification about electrical power attaches great importance to transformers. In general, transformer-oriented safety standards set forth insulation distance requirements, circuit requirements, and requirements for parts and components; in this regard, transformer size mostly depends on insulation distance requirements. The insulation distance is the shortest possible spatial distance between two conductive parts (components) or between a conductive part (component) and an apparatus protection interface. In other words, given electrical performance stability and safety, the insulation distance is the shortest possible distance at which insulation is attained through air.

Take UL certification as an example, for the sake of user protection, insulation is of five levels: operation insulation, basic insulation, dual insulation, auxiliary insulation, and enhanced insulation, to ensure product safety. On the other hand, safety compliance of the structure of the transformer is evaluated in steps as follows: determining the operating voltage of the transformer, determining the insulation distance, and inspecting the structuring according to the determined operating voltage and insulation distance repeatedly. The inspection is mainly performed on the following dimensions: primary-side coil versus secondary-side coil, primary-side coil versus magnet core, and secondary coil versus magnet core. In this regard, the distance between primary-side coil and secondary-side coil must at the very least meet the requirement of dual or enhanced insulation, whereas the transformer requires three tiers of insulation cords and a custom-made framework in order to effect winding, with a view to acquiring UL certification.

BRIEF SUMMARY OF THE INVENTION

A conventional LLC converter uses an LLC circuit to perform resonance so as to effect the zero voltage switching between half-bridge switches, thereby achieving high conversion efficiency. The transformer is capable of attaining secondary-side isolation and insulation of an electric appliance; hence, a circuit which meets safety requirements and specific winding are required while meeting requirements of dual or enhanced insulation in order to meet safety standards. Therefore, the transformer incurs high cost, and its circuit is bulky.

To achieve at least the above objective, the present disclosure provides an LLC converter which comprises a switch module, transformer, output circuit, resonant circuit and safety capacitor. The switch module is connected between the input voltage and a ground. The transformer has a primary side winding and at least one secondary side winding. The output circuit is connected between the at least one secondary side winding and a load. The resonant circuit is coupled between the primary side winding and the switch module and comprises at least one leakage inductor. The safety capacitor is connected between the leakage inductor and the switch module.

Therefore, an LLC converter provided by embodiments of the present disclosure comprises a safety capacitor for achieving dual or enhanced insulation to meet isolation requirements, spares a transformer the duty of meeting conventional safety and isolation requirements, and uses a low-cost circuit or a high-efficiency circuit, such as stranded wire or flat wire, thereby allowing the transformer framework and shape greatly reduces and thus downsizing the transformer.

To enable persons skilled in the art to further understand the features and technical solutions of the present disclosure, the present disclosure is hereunder illustrated by detailed descriptions and accompanying drawings. But the detailed descriptions and accompanying drawings are only illustrative of the present disclosure but are not restrictive of the claims of the present disclosure.

DETAILED DESCRIPTION OF THE INVENTION

The operation of an LLC converter of the present disclosure is hereunder illustrated by embodiments and depicted with accompanying drawings.

Figure 1:
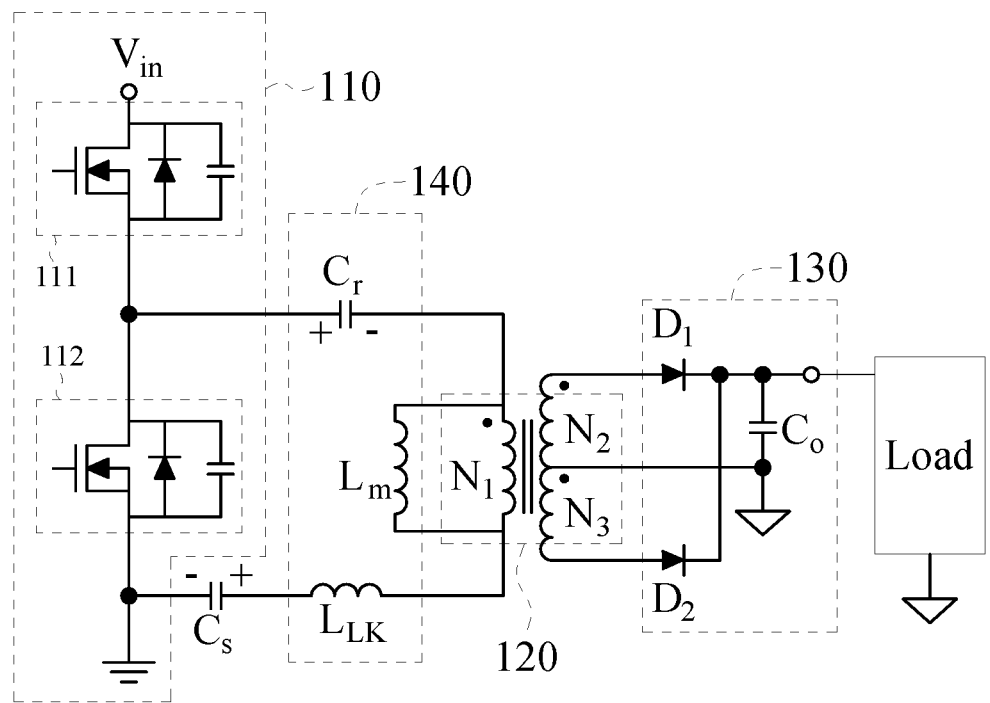
FIG. 1 is a circuit diagram of an LLC converter according to an embodiment of the present disclosure.

To provide an LLC converter which spares a transformer the duty to take care of electrical isolation and insulation between a secondary side winding, the present disclosure provides an LLC converter using a safety capacitor to meet safety and isolation requirements. Referring to FIG. 1, there is shown a circuit diagram of an LLC converter according to an embodiment of the present disclosure. As shown in FIG. 1, an LLC converter 100 comprises a switch module 110, transformer 120, output circuit 130, resonant circuit 140 and safety capacitor Cs. The switch module 110 is connected between input voltage Vin and the ground. The transformer 120 has a primary side winding N1 and two secondary side windings N2, N3. The output circuit 130 is connected between secondary side windings N2, N3 and a load (i.e., output voltage Vo). The resonant circuit 140 is coupled between the primary side winding N1 and switch module 110 and comprises at least one leakage inductor $L_{LK}$. The safety capacitor Cs is connected between the leakage inductor $L_{LK}$ and switch module 110.

The switch module 110 comprises a first switch 111 and a second switch 112. The first switch 111 is connected between input voltage Vin and second switch 112. The second switch 112 is connected between first switch 111 and the ground. The LLC converter 100 provides AC voltage to the transformer 120 through the ON and OFF of the first switch 111 and second switch 112 relative to each other and switching between them.

The resonant circuit 140 further comprises a resonant capacitor Cr and a resonant inductor Lm. The leakage inductor $L_{LK}$ is connected to safety capacitor Cs and one end of primary side winding N1. The resonant capacitor Cr is connected to switch module 110 and the other end of primary side winding N1. The resonant inductor Lm straddlingly connects to the two ends of primary side winding N1. The resonant circuit 140 causes resonance of AC voltage provided to the transformer 120, using the resonant capacitor Cr, resonant inductor Lm, and leakage inductor $L_{LK}$, so as to preclude voltage difference in the ON and OFF of first switch 111 and second switch 112 relative to each other and switching between ON and OFF.

The output circuit 130 comprises diodes D1, D2 and stabilization capacitor Co. The secondary side winding N2 is connected between the anode of diode D1 and secondary side winding N3. The secondary side winding N3 is connected between the anode of diode D2 and secondary side winding N2. The stabilization capacitor Co is connected between the common of the cathode of diode D1 and the cathode of diode D2 and the common of the secondary side windings N2, N3.

In this embodiment, the safety capacitor Cs is connected between the leakage inductor $L_{LK}$ and the ground. The resonant capacitor Cr is connected between the primary side winding N1 and the common of first switch 111 and second switch 112. The safety capacitor Cs enables isolation of the voltage transmission path at the leakage inductor $L_{LK}$. The resonant capacitor Cr enables isolation of the voltage transmission path at the other end of the primary side winding N1. Hence, the transformer 120 need not take care of electrical isolation and insulation of primary side winding N1 and secondary side windings N2, N3 from each other. Hence, not only can the insulation distance between the primary side winding N1 and secondary side windings N2, N3 be reduced, but winding which conforms with safety standards and transformer framework are also unnecessary. Hence, the size of the transformer 120 can be greatly reduced. In a preferred embodiment, the electrical isolation distance between primary side winding N1 and secondary side windings N2, N3 of the transformer 120 is reduced to 0.1 mm~8 mm.

In the above embodiments, since safety capacitor Cs enables electrical isolation and insulation, the requirement of dual or enhanced insulation between the two terminal of safety capacitor Cs must be met, for example, a distance of 8 mm. Likewise, although the main purpose of resonant capacitor Cr is to cause resonance of AC voltage provided to the transformer 120, the requirement of dual or enhanced insulation between the two terminal of resonant capacitor Cr must be met in order for the voltage transmission path to attain isolation and insulation before reaching primary side winding N1.

Figure 2:
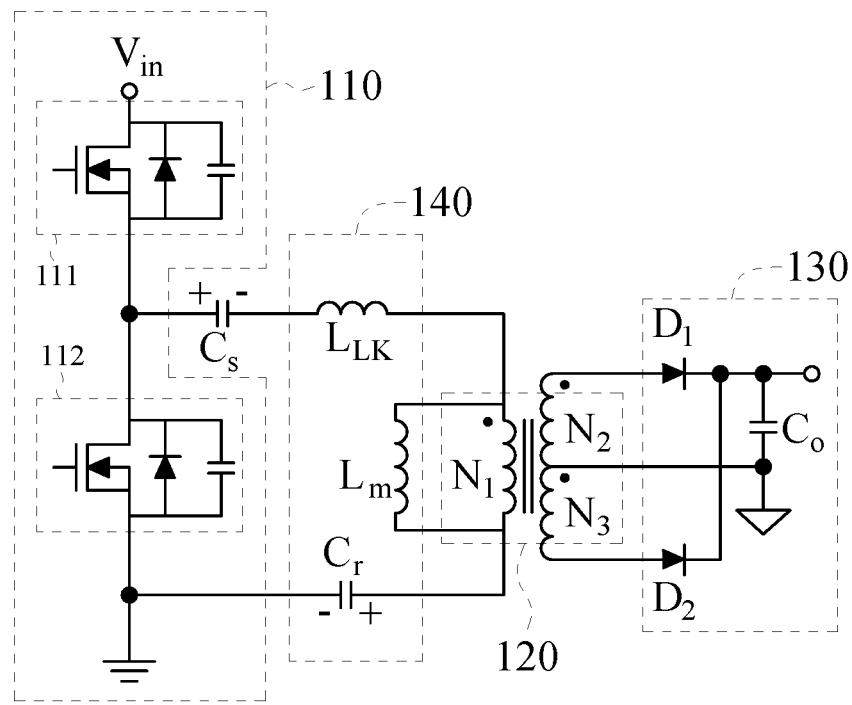
FIG. 2 is a circuit diagram of the LLC converter according to another embodiment of the present disclosure.

Referring to FIG. 2, there is shown a circuit diagram of the LLC converter according to another embodiment of the present disclosure. For the sake of clarity, where a component shown in FIG. 2 shares the same function as another component shown in FIG. 1, the components are denoted by the same reference numeral. The LLC converter 200 shown in FIG. 2 and the LLC converter 100 shown in FIG. 1 are substantially identical in terms of configuration and operation except that, in the LLC converter 200 shown FIG. 2, the safety capacitor Cs is connected between the leakage inductor $L_{LK}$ and the common of first switch 111 and second switch 112. The resonant capacitor Cr is connected between primary side winding N1 and the ground. After studying the above description of the LLC converter 100, persons skilled in the art can easily understand the principles of the LLC converter 200. Hence, its principles are not described again, for the sake of brevity.

Figure 3:
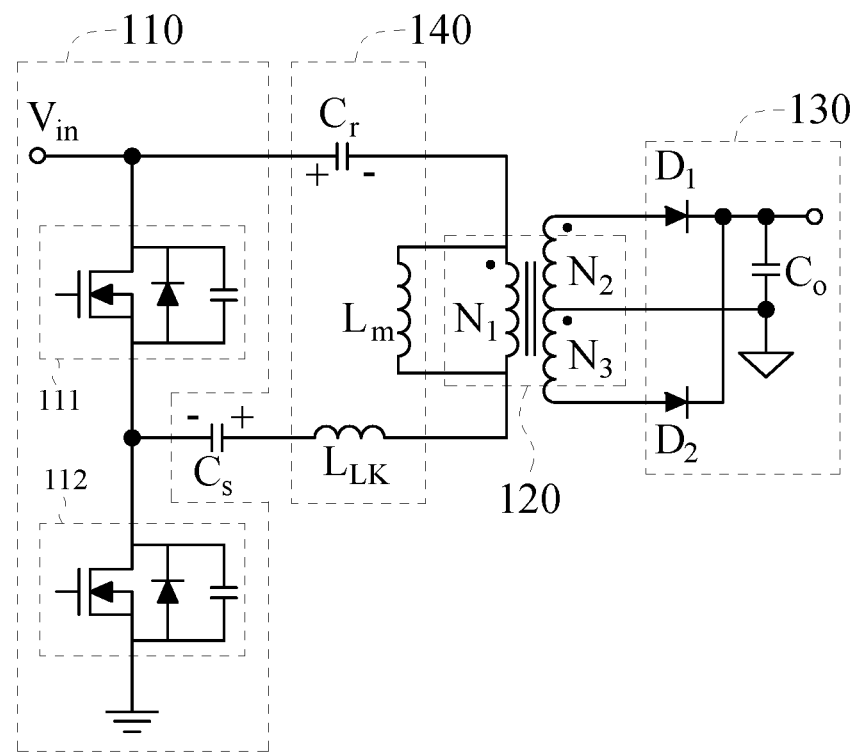
FIG. 3 is a circuit diagram of the LLC converter according to yet another embodiment of the present disclosure.

Referring to FIG. 3, there is shown a circuit diagram of the LLC converter according to yet another embodiment of the present disclosure. For the sake of clarity, where a component shown in FIG. 3 shares the same function as another component shown in FIG. 1, the components are denoted by the same reference numeral. The LLC converter 300 shown in FIG. 3 and the LLC converter 100 shown in FIG. 1 are substantially identical in terms of configuration and operation except that, in the LLC converter 300 shown in FIG. 3, the safety capacitor Cs is connected between the leakage inductor $L_{LK}$ and the common of first switch 111 and second switch 112. The resonant capacitor Cr is connected between primary side winding N1 and input voltage Vin. After studying the above description of the LLC converter 100, persons skilled in the art can easily understand the principles of the LLC converter 300. Hence, its principles are not described again, for the sake of brevity.

Figure 4:
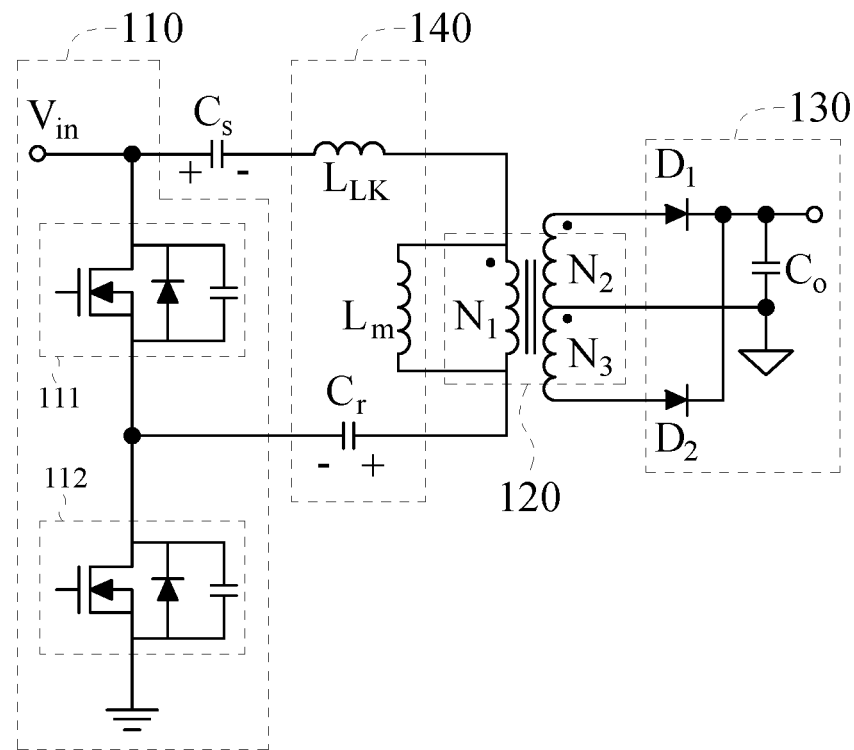
FIG. 4 is a circuit diagram of the LLC converter according to yet another embodiment of the present disclosure.

Referring to FIG. 4, there is shown a circuit diagram of the LLC converter according to yet another embodiment of the present disclosure. For the sake of clarity, where a component shown in FIG. 4 shares the same function as another component shown in FIG. 2, the components are denoted by the same reference numeral. The LLC converter 400 shown in FIG. 4 and the LLC converter 200 shown in FIG. 2 are substantially identical in terms of configuration and operation except that, in the LLC converter 400 shown in the FIG. 4, the safety capacitor Cs is connected between the leakage inductor $L_{LK}$ and input voltage Vin. The resonant capacitor Cr is connected between the primary side winding N1 and the common of first switch 111 and second switch 112. After studying the above description of the LLC converter 200, persons skilled in the art can easily understand the principles of the LLC converter 400. Hence, its principles are not described again, for the sake of brevity.

Figure 5:
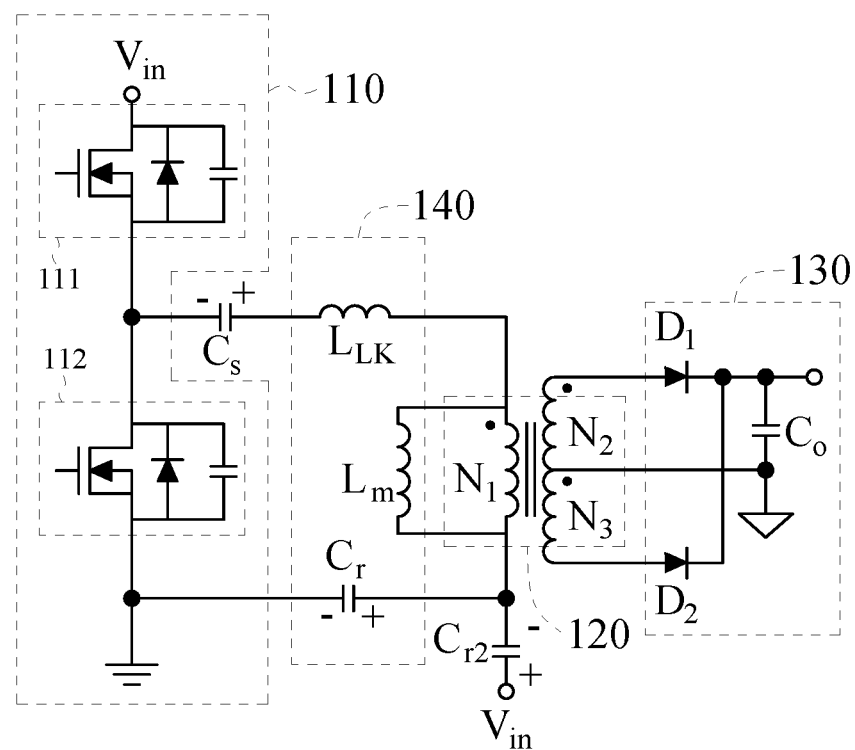
FIG. 5 is a circuit diagram of the LLC converter according to yet another embodiment of the present disclosure.

Referring to FIG. 5, there is shown a circuit diagram of the LLC converter according to yet another embodiment of the present disclosure. For the sake of clarity, where a component shown in FIG. 5 shares the same function as another component shown in FIG. 2, the components are denoted by the same reference numeral. The LLC converter 500 shown in FIG. 5 and the LLC converter 200 shown in FIG. 2 are substantially identical in terms of configuration and operation except that the LLC converter 500 shown in FIG. 5 further comprises a resonant capacitor Cr2. The resonant capacitor Cr2 is connected between the input voltage Vin and the common of resonant capacitor Cr and primary side winding N1. After studying the above description of the LLC converter 200, persons skilled in the art can easily understand the principles of the LLC converter 500. Hence, its principles are not reiterated, for the sake of brevity.

While the present disclosure has been described by means of specific embodiments, numerous modifications and variations could be made thereto by those skilled in the art without departing from the scope and spirit of the present disclosure set forth in the claims

What is claimed is:

1. An LLC resonant converter, comprising:
   a switch module connected between an input voltage and a ground;
   a transformer having a primary side winding and at least one secondary side winding;
   an output circuit connected between the at least one secondary side winding and a load;
   a resonant circuit coupled between the primary side winding and the switch module and comprising at least one leakage inductor, a first resonant capacitor, and a resonant inductor, with the at least one leakage inductor connected to the safety capacitor and a first end of the primary side winding, the first resonant capacitor connected to the switch module and a second end of the primary side winding, and the resonant inductor straddlingly connected to the first end and the second end of the primary side winding; and
   the safety capacitor connected between the at least one leakage inductor and the switch module, wherein the at least one leakage inductor has a first terminal connected to the primary side winding and a second terminal connected to the switch module through only a first voltage transmission path having the safety capacitor;
   wherein the safety capacitor enables isolation of the first voltage transmission path with respect to the leakage inductor and the first resonant capacitor enables isolation of a second voltage transmission path with respect to the second end of the primary side winding in order to isolate the primary side winding and the at least one secondary side winding from each other.

2. The LLC converter of claim 1, wherein the output circuit comprises a first diode, a second diode and a stabilization capacitor, the at least one secondary side winding comprises a first secondary side winding and a second secondary side winding, the first secondary side winding is connected between an anode of the first diode and the second secondary side winding, the second secondary side winding is connected between an anode of the second diode and the first secondary side winding, and the stabilization capacitor is connected between a common of a cathode of the first diode and a cathode of the second diode and a common of the first secondary side winding and the second secondary side winding.

3. The LLC converter of claim 2, wherein the switch module comprises a first switch and a second switch, the first switch is connected between the input voltage and the second switch, and the second switch is connected between the first switch and the ground.

4. The LLC converter of claim 3, wherein the safety capacitor is connected between the at least one leakage inductor and a common of the first switch and the second switch.

5. The LLC converter of claim 3, wherein the safety capacitor is connected between the ground and the at least one leakage inductor.

6. The LLC converter of claim 3, wherein the safety capacitor is connected between the input voltage and the at least one leakage inductor.

7. The LLC converter of claim 1, wherein the resonant circuit further comprises a second resonant capacitor connected between the second end of the primary side winding and the input voltage.

8. The LLC converter of claim 1, wherein an electrical isolation distance between the primary side winding and the at least one secondary side winding is 0.1 mm~8 mm.

* * * * *